May 5, 1942.  S. H. BROOKS  2,281,914
LUBRICATED SHAFT AND GEAR MEANS
Filed Sept. 12, 1940
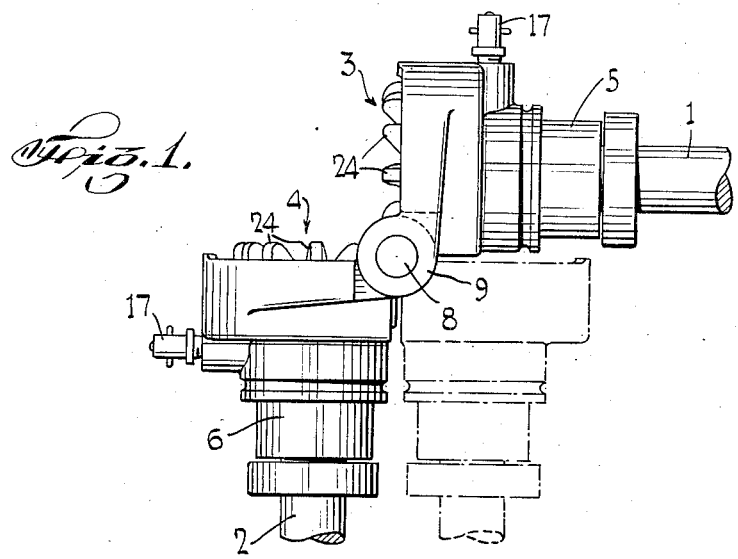
Fig. 1.
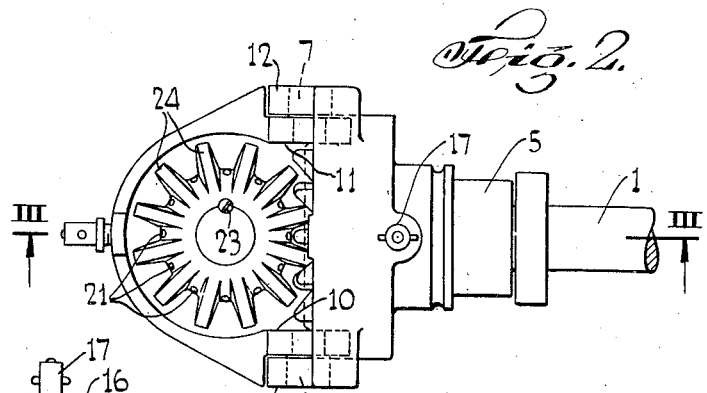
Fig. 2.
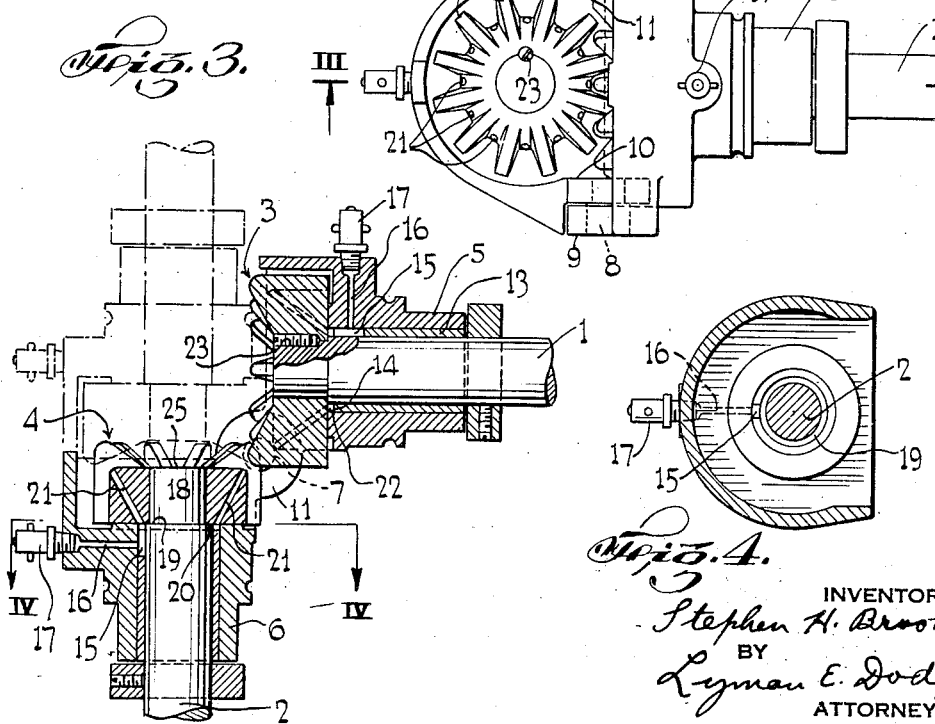
Fig. 3.
Fig. 4.
INVENTOR
Stephen H. Brooke
BY
Lyman E. Dodge
ATTORNEY Patented May 5, 1942

2,281,914

UNITED STATES PATENT OFFICE 2,281,914

LUBRICATED SHAFT AND GEAR MEANS

Stephen H. Brooks, New York, N. Y., assignor to Brooks Equipment Corporation, New York, N. Y., a corporation of New York Application September 12, 1940, Serial No. 356,486

1 Claim. (Cl. 74—468)

This invention relates to machine elements, particularly coupling elements, and more especially lubricated shaft and gear means.

A principal object of this invention is the production of a device of the type specified which is so constructed that all parts may be easily, sufficiently, and properly lubricated.

A further object of the invention is the provision of a device of the type specified which will be simple in construction, readily built, easily installed and maintained, and durable and efficient in operation.

Further objects and advantages will appear as the description of the invention and the particular physical embodiments selected to illustrate the invention progresses, and the novel features will be particularly pointed out in the appended claim.

In describing the invention in detail, and the particular physical embodiments selected to illustrate the invention, reference will be had to the accompanying drawing and the several views thereon, in which like characters of reference designate like parts throughout the several views, and in which:

Figure 1 is a side elevational view illustrating a device embodying the invention, the parts shown in dash and dot line being a moved position of one of the parts; Fig. 2 is a top plan view of the device as shown by Fig. 1; Fig. 3 is a cross-sectional view of the device as shown by Fig. 2 on the plane indicated by the line III—III, viewed in the direction of the arrows at the ends of the line; Fig. 4 is a cross-sectional view of the device as shown by Fig. 3 on the plane indicated by the line IV—IV, viewed in the direction of the arrows at the ends of the line.

The device, in general, includes a shaft 1 and a shaft 2 and gears 3 and 4. The gear 3 intermeshes with the gear 4 and, consequently, a rotation of either shaft causes a rotation of the other.

Shaft 1 is journalled in a housing 5 and shaft 2 in a housing 6. These housings are attached together by pivot pins 7 and 8 positioned in ears, arranged in pairs, 9 and 10, 11 and 12. Due to this pivoting arrangement, shaft 1 may, as is shown in Figs. 1 and 3, be moved from the dash dot line position of Fig. 1, that is, through substantially an angle of 180 degrees and the gears 3 and 4 will still remain in mesh and operate to transmit motion from one shaft to the other.

Between each housing and the shaft is placed a bushing as 13. This bushing at one end may well be flush with the end of the housing, that is, at the right hand end, as viewed in Fig. 3. At the other end it is stopped at a point 14 some distance short of the end of the housing 5 and it also has a cut away portion 15 at the top thereof communicating with a duct 16 through which lubricant may be introduced in any suitable and appropriate manner as by the well known Alemite fitting 17.

The gears 3 and 4 are positioned upon the ends of the shafts 1 and 2, preferably by forming a reduced portion 18 of the shaft thereby forming a shoulder 19 and one end of each gear abuts the housing as at 20 thereby limiting the movement of the gear in one direction.

Ducts as 21 are formed in each of the gears 3 and 4 opening at the inner end in the space 22 at the end of the bushing 13 so that lubricant placed in 17 and conducted through duct 16, to cut-away portion 15 and thence to the space 22, may flow through ducts 21 and so to the face of the gears and lubricate the teeth thereof and at the same time lubricate the contacting surfaces between the back face of the gear and the housing.

The gears 3 and 4 are alike in construction and are preferably secured on the shafts by a blind set screw 23. Each gear is provided with a plurality of teeth, as 24, and these teeth not only project forwardly of the front surface 25 of a gear but also laterally of a side surface as 26 whereby the gears may intermesh and one drive the other whether the shaft 1 is in the dot and dash line position as shown in Fig. 3 or is in the dot and dash line position as shown in Fig. 1.

Although I have particularly described one particular physical embodiment of my invention explained the operation, construction and principle thereof, nevertheless I desire to have it understood that the form selected is merely illustrative, but does not exhaust the possible physical embodiments of the idea of means underlying my invention.

What I claim as new and desire to secure by Letters Patent of the United States, is:

In a lubricated shaft and gear, including, in combination: a housing formed with an orifice for receiving a shaft; a gear formed with teeth on said shaft; a bushing positioned between the shaft and the housing, said bushing terminating short of the end of the housing adjacent the gear providing a chamber, and said bushing provided with a cut-away portion; a duct in the housing communicating with the said cut-away portion; said gear formed with a plurality of ducts, each duct opening at one end at the face of the gear between teeth and at the other end at the said chamber whereby lubricant may be inserted in the duct of the housing and flow along the cut away portion to the said chamber and thence to and through the ducts opening at the face of the gear.

STEPHEN H. BROOKS.